INVENTOR
PIETRO CHIESORIN

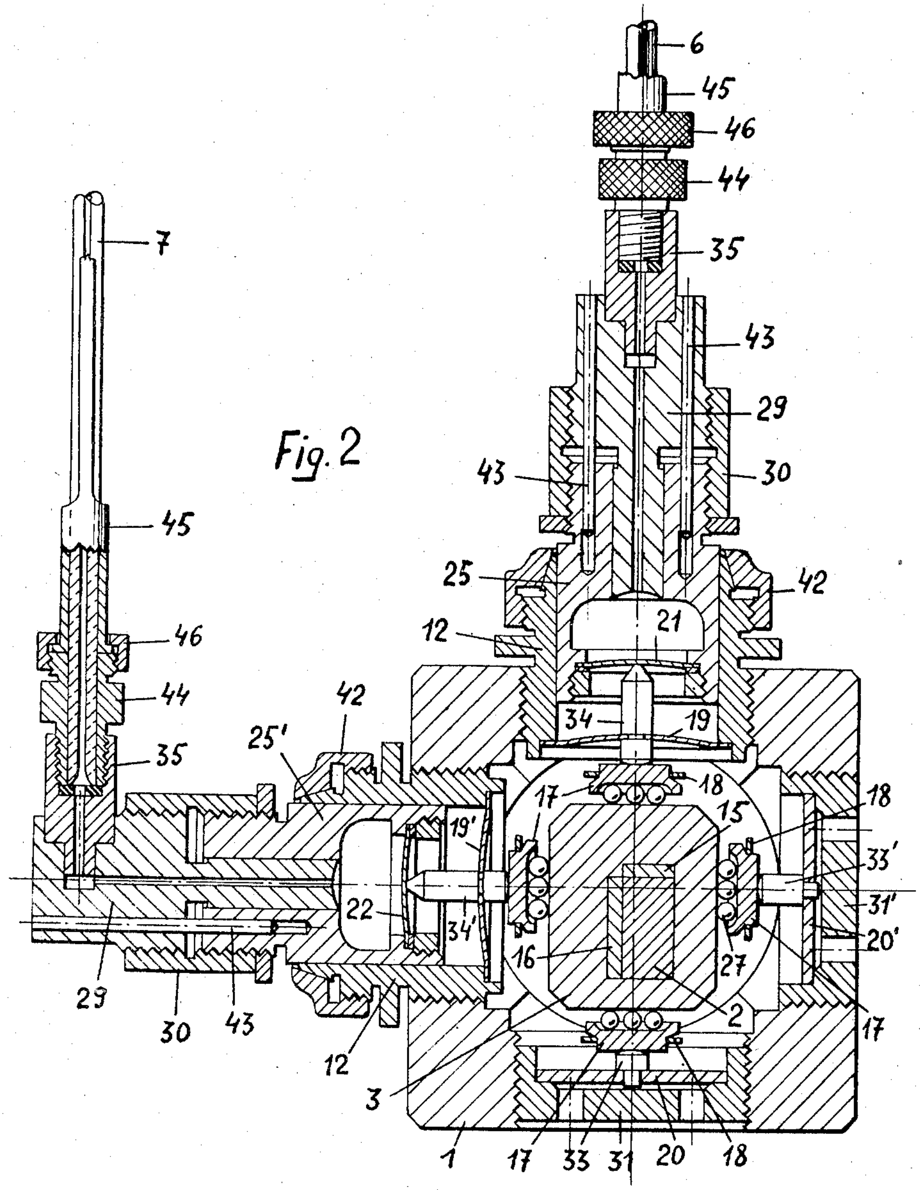
INVENTOR
PIETRO CHIESORIN
BY [signature] agt

United States Patent Office 2,829,516

Patented Apr. 8, 1958

1

2,829,516

APPARATUS FOR MEASURING THE COMPONENTS OF THE CUTTING EFFORT IN TURNING AND PLANING WORK

Pietro Chiesorin, Genoa, Italy

Application July 13, 1953, Serial No. 367,685

Claims priority, application Italy July 16, 1952

7 Claims. (Cl. 73—133)

The present invention has for its object an apparatus by means of which it is possible to measure one, two or three components of the cutting force in turning and planing works. According to the invention, these forces are transmitted to one or several elastic membranes, preferably metallic, disposed in the direction of the forces which cause their elastic deformations. These forces, in their turn, cause changes of volume of chambers constituting reservoirs for a liquid, generally mercury. These chambers communicate with vertical tubes of small diameter, almost capillary. Consequently, as the deformations of the membranes cause variations in the capacity of the said chambers, corresponding variations in the height of the columns of mercury in these small vertical tubes take place, enabling the forces causing these deformations to be measured.

In contradistinction with other measuring apparatus, which are generally based on the transmission of elastic deformations of pieces having a complicated shape to delicate and complicated systems of mechanical amplification, the device according to the invention is characterized by:

(*a*) Its extreme simplicity of construction arising out of the absence of mechanical transmission.

(*b*) The constancy of the characteristic constants of the indicator, even when the instrument is used during protracted periods, owing to the fact that the amplified transmission of the deformations of the membranes is achieved by means of a simple liquid arrangement.

Other advantages of the invention will become evident in the course of the following description of a preferred embodiment of the invention given by way of example which is non-limiting with reference to the accompanying drawings, in which:

Fig. 2 is a transverse section along the line II—II of Fig. 1.

Figures 1, 3:
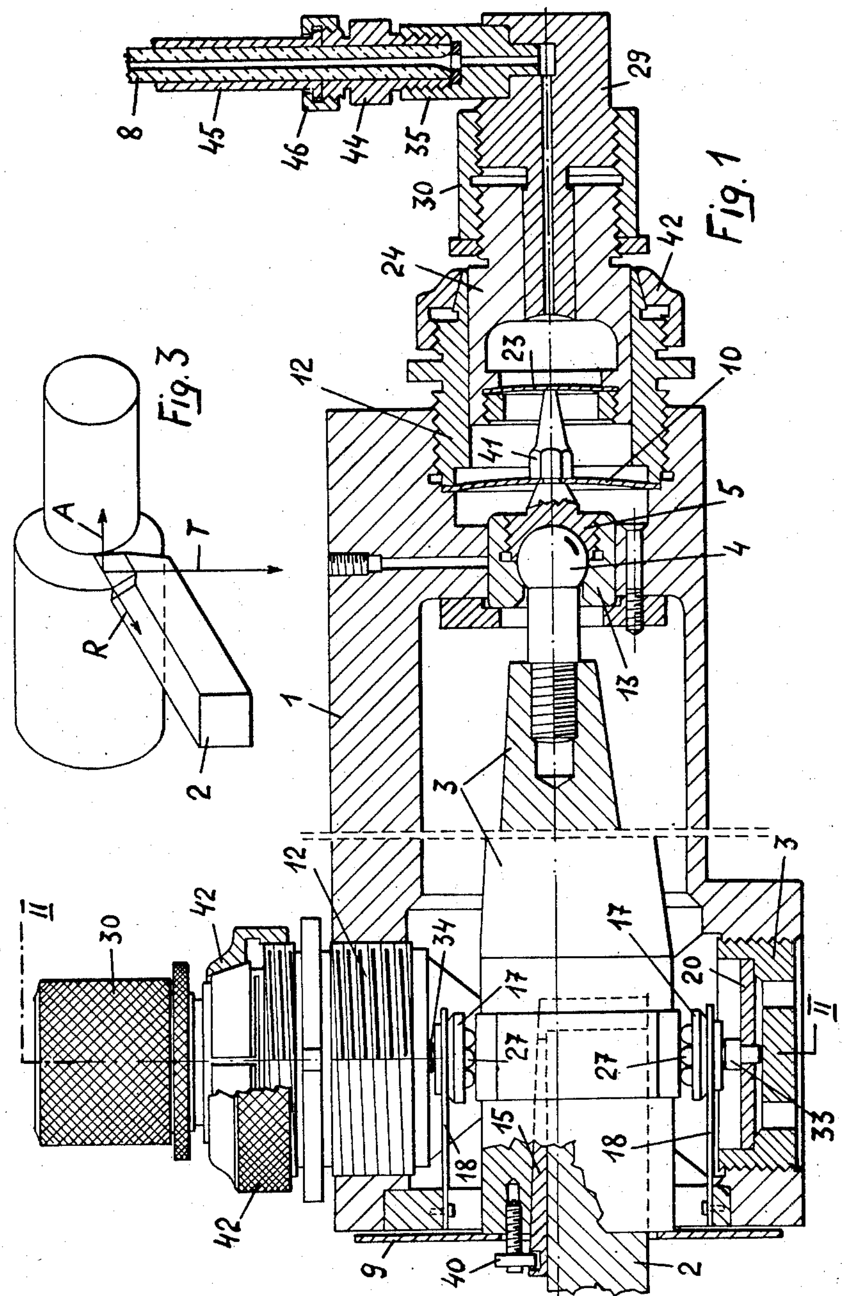
Fig. 1 is a longitudinal section showing parts of the device for measuring the three components of the cutting force in turning, planing and similar works.
Fig. 3 is a demonstration diagram of the three components of the cutting force in turning works.

With particular reference to Fig. 3, it will be seen that, in turning works, the principal force is exerted in a tangential or vertical direction, and is indicated by the letter T in this figure, while the secondary forces are the axial force, which is exerted in the direction A of the feed of the tool and the radial force which is exerted in the direction R which corresponds substantially to a direction perpendicular to the axis of rotation of the piece being machined.

The apparatus which is going to be described with reference to Figs. 1 and 2 is adapted to measure all three components aforesaid of the cutting force, although, as it will be better seen subsequently, the apparatus may be simplified to enable only one or two of these components to be measured.

In principle, the apparatus comprises a body 1, generally having an external prismatic shape of square sec-

2 tion, although, as it will be well understood, it may have another external shape provided that its base be plane.

In this body 1 is provided a cavity constituting a cylindrical chamber at each end of which is axially disposed a circular opening, one of which is intended to receive a tool-carrier while the other is intended to receive the devices for the measure of the radial cutting forces.

In the cylindrical chamber of the body 1 is inserted at one end a tool-carrier 3 which is constituted by a prismatic member provided at the end with a recess of suitable shape in which may be mounted the cutting tool 2 which may be secured in its working position by any suitable means, such as a combination of a pair of wedge-shaped keys or packing strips 15, 16, adapted to be tightened against the tool 2 for example by means of a screw 40 provided with a collar or other suitable tightening means.

At the portion opposite to that to which is secured the tool 2, the tool-carrier 3 is provided with a ball-and-socket joint 4 adapted to turn through small angles in all directions. The ball of the joint turns in a bearing 13 the shape of which is generally cylindrical, or even prismatic, slidably mounted in the opening at the end of the cylindrical chamber and maintained in position by means of a threaded head 5 provided with a rod the end of which is threaded and passes through a hole provided in a resilient diaphragm 10 to which it is secured by means of a nut 41.

The diaphragm 10 is fixed against a flange of the opening aforesaid by means of a threaded sleeve 12 in which is disposed a neck 24 locked by means of a threaded collar 42. At the bottom of this neck is mounted and held in position by any suitable means a thin metallic membrane 23.

The opening of the neck 24 is closed by a piston 29 adapted to be displaced axially by means of the threaded sleeve 30, knurled externally, and being guided by rods 43 (Fig. 2). The neck 24 communicates, by means of a central bore of the piston 29, with a union 35 in which is inserted a small tube having an almost capillary bore, locked in a vertical position by means of a threaded sleeve. The lower portion of the tube 8 is protected by a metallic sheath 45 secured by a threaded sleeve 46 to a sleeve 44 fixing the tube 8 to the union 35. In the neck 24 is provided a chamber filled with mercury, which fills also the bore of the piston 29 and the lower portion of the tube 8. Should it be found necessary to remove the tube 8, this is done by unscrewing the neck 44 and substituting for it a screwed stopper or other means.

The tool-carrier, mounted in this manner, is capable of oscillating in all directions in the end opening of the cylindrical chamber of the body 1 and can also perform slight axial displacements together with the support 13 which is slidably mounted on the body 1. In order to maintain the tool-carrier in its central position with respect to the body 1 while at the same time permitting it to perform very slight oscillations, proportional to the vertical and axial components of the cutting forces, and in order to be able to measure these components, the tool-carrier 3 is supported at its front part by four short rods 33—33' and 34—34' solid with the resilient membranes 20—20' and 19—19' (Fig. 2) co-axial in pairs and mounted in the body 1 in planes mutually perpendicular. These rods are pushed against the tool-carrier 3 by the intermediary of small cups 17 of suitable shape, maintained in contact with the faces of the tool-carrier 3 by suitable springs 18. In these small cups 17 are disposed small balls 27. The rods 34—34' in their turn exert an action against the thin membranes 21—22 and in this way cause variations in the capacity of the chamber provided in the neck 25 or 25', which contains the mercury.

In the embodiment shown in the drawings, at the time of the adjustment of the instrument when it is being assembled, the rods 34 and 34′ are pushed with a sufficient force against the thin membranes 21 and 22 by screwing in a suitable manner the stoppers 31 and 31′ which, owing to the rods 33 and 33′ solid with the strong spring means, such as membranes 20 and 20′ push the corresponding cups 17 which, by the intermediary of their balls 27, push the tool-carrier against the rods 34—34′ aforesaid. The rods 34 and 34′ being pushed from the outside, cause the membranes or blades 19—19′ to bend slightly and, by pushing the membranes 21 and 22 cause them to bulge outwardly, and so a certain quantity of mercury is forced in the small tubes 6 and 7. The body is closed by the protecting plate 9.

The working of the apparatus which has just been described is obvious.

In the first place it must be noticed that the apparatus is provided with diaphragms or membranes and with small tubes suitable for the forces to be measured.

The tool-carrier is preliminarily adjusted by screwing the stoppers 31 and 31′ to the extent necessary to bring the level of the mercury column to its maximum level in the tubes 6 and 7, which level corresponds to zero in the case under consideration. Furthermore, the sleeve 44 is adjusted until the mercury level in tube 8 occupies its lowest position, corresponding also to zero. This being done, and with each of the measuring tubes provided with a suitable graduation, the latter is calibrated, after which the apparatus is fixed in position on the lathe and a trial turning test is performed.

In this manner, one can easily obtain a measure of the three components by reading the lowering of the mercury in the columns of the tubes 6 and 7, the tool-carrier being subjected to forces which tend to displace it downwards and to the right of Fig. 2, while for the radial forces, that is to say the forces directed axially of the tool, the membrane 23 will be pressed towards the outside thereby reducing the capacity of the chamber inside the neck 24 and causing a rise of the column of mercury in the tube 8.

It will be seen that the apparatus according to the invention eliminates the drawbacks of the devices generally employed based on the use of complicated resilient members and on the mechanical amplification of their deformations by means of systems of levers or racks or other mechanical transmission devices which are liable to be readily put out of order.

From the above, it results evidently that, in addition to its extreme simplicity of construction and to the constancy of the constants of the indicating part of the apparatus even after a protracted use of the instrument, the apparatus just described may be used to indicate forces within a very large range inasmuch as different resilient diaphragms or membranes may be used.

The instrument which has just been described may naturally be constructed for ascertaining only one or two of the three components, simply by doing away with the corresponding indicating parts. Besides, although, in the apparatus just described, for the vertical and axial components, the level of the mercury falls as the forces increase, for the axial component it is possible to arrange matters so that the level of the mercury rises when the component becomes greater, as is the case for the radial component.

After a suitable calibration, the instrument which has been described may be used for different purposes, namely:

(1) For ascertaining the value of one, two or three components of the cutting force in turning works.

(2) For comparative tests of the cutting capacity of several materials of the same nature, for the purpose of ascertaining which is the most easily machined.

(3) For carrying out checking tests of cutting forces of two materials which have been considered as being identical.

(4) For carrying out tests on the performance of the tool as a function of its shape and of its angular position.

(5) For investigating the wear of the cutting edge of the tool in connection with the values of the components of the cutting force.

(6) For ascertaining, during the performance of a work, the net power required for detaching a turning.

(7) For ascertaining the overall output of a lathe under various conditions of load, being known the power absorbed by the electric motor which drives it.

(8) For carrying out comparative tests on the lubricants used for cutting metals.

It is evident that the instrument may be mounted principally on a lathe, but it may also be mounted on a planing machine after certain modifications have been made in the arrangement of the chambers containing the mercury and the support of the tool-carrier.

Naturally, the apparatus is susceptible of numerous constructive modifications without departing from the scope of the statement of claims. For example, the cups containing the balls may be replaced by small cages, the tool-carrier 3 may project somewhat out of the body 1 and the tool may be secured in position in a manner which differs from that described.

What I claim is:

1. A device for measuring a component in a predetermined direction of cutting forces acting on tools of lathes or the like comprising, in combination, a support; an elongated tool carrier means having one end thereof mounted on said support for sliding movement relative thereto along a predetermined path, said tool carrier means being adapted to carry a tool at the other end thereof; spring means connected to said support and to said tool carrier means near one end thereof for urging said tool carrier means in one predetermined direction along said predetermined path; and indicating means for indicating the magnitude of the component of a force acting on a tool carried by said tool carrier means in the opposite direction along said predetermined path, said indicating means comprising a body member having a chamber therein, an indicating tube connected to said body member and in communication with said chamber, and a liquid within said chamber and said tube, said chamber having a flexible wall connected to said one end of said tool carrier means so that movement thereof along said predetermined path causes deformation of said flexible wall whereby the volume of said chamber and consequently the amount of liquid within said indicating tube is dependent upon the amount of movement of said tool carrier means along said predetermined path and consequently is a function of the magnitude of the component of a force acting on the tool carried by the tool carrier means along said predetermined path.

2. A device for measuring components of cutting forces acting on tools of lathes or the like comprising, in combination, a support; an elongated tool carrier means having one end thereof mounted on said support for sliding movement relative thereto along a predetermined path and for pivoted universal movement relative to said support, said tool carrier means being adapted to carry a tool at the other end thereof; first spring means connected to said support and to said tool carrier means near said one end thereof for urging said tool carrier means in a first predetermined direction along said predetermined path; first indicating means for indicating the magnitude of the component of a force acting on a tool carried by said tool carrier means along said path in a direction opposite to said first predetermined direction, said first indicating means comprising a first body member having a first chamber therein, a first indicating tube connected to said first body member in communication with said first chamber, and a liquid within said first chamber and said first tube, said first chamber having a first flexible wall connected to said one end of said tool carrier so that movement thereof along said predetermined path causes deformation of said first flexible wall whereby the volume of said first chamber and consequently the amount of liquid within said first indicating tube is dependent upon the amount of movement of said tool carrier along said predetermined path and consequently is a function of the magnitude of the component of a force acting on the tool carried by the tool carrying means along said path in the direction opposite to said first predetermined direction; second spring means connected to said support and to said tool carrier means at a point spaced from said one end thereof for urging said other end thereof in a second predetermined direction substantially normal to said first direction; and second indicating means for indicating the magnitude of a force acting on the tool carried by said tool carrier means in a direction opposite to said second predetermined direction, said second indicating means comprising a second body member having a second chamber therein, a second indicating tube connected to said second body member in communication with said second chamber, and a liquid within said second chamber and said second tube, said second chamber having a flexible wall connected to said tool carrier means at a point spaced from one end thereof so that pivotal movement thereof causes deformation of said second flexible wall whereby the volume of said second chamber and consequently the amount of liquid within said second indicating tube is dependent upon the amount of pivotal movement of said tool carrier means and consequently is a function of the magnitude of the component of a force acting on the tool carried by said tool carrier means in a direction opposite to said second predetermined direction.

3. A device as set forth in claim 2 wherein the liquid in said first and second chambers is mercury.

4. A device for measuring components of cutting forces acting at right angles to the axis of tools of lathes or the like, viz. the tangential and axial components and comprising in combination, a hollow body, an elongated tool carrier means having one end thereof mounted for pivoted universal movement relative to said hollow body and being adapted to carry a tool at the other end thereof, a first unit comprising a robust resilient membrane mounted in said body near said one end of the said tool carrier, anti-friction means interposed between said resilient membrane and the tool carrier and means for urging with a measured pressure said elastic membrane against said tool carrier through said anti-friction means; resilient means mounted near said one end of the tool carrier, a chamber filled with liquid and opening in an upright open-ended almost capillary tube mounted near said latter mentioned resilient means; and having a thin resilient wall facing said last-named resilient means, anti-friction means inserted between said tool carrier and said last-named resilient means and said resilient wall and being positioned directly opposite to said first mentioned anti-friction means and transmitting angular displacement of the tool carrier in the plane of said oppositely positioned anti-friction means to said resilient member and resilient wall and a second unit comprising a robust resilient membrane, means for holding and adjustably shifting same, resilient means, liquid-filled chamber opening in an upright almost capillary tube and anti-friction means inserted between the tool carrier and said resilient membranes, means and walls, the whole arranged as in the first unit but at right angles to the same first named unit.

5. A device according to claim 4 comprising further, means in said body for mounting said tool carrier for sliding movement relative thereto along a predetermined path, diaphragm spring means connected to said body and to said tool carrier means near said one end thereof, said diaphragm spring means being so arranged as to resist sliding movement of said tool carrier means and indicating means for indicating the magnitude of the radial component of a force acting on a tool carried by said tool carrier, axially with respect to this latter.

6. A device according to claim 4 in which said anti-friction means inserted between the elastic membranes and the tool carrier and between the elastic means and the tool carrier comprise flat cups containing rolling balls pressed by said spring means through pivotal connections against plane faces of said tool carrier.

7. A device according to claim 4, in which the means for holding and adjustably pressing said robust membranes against said means interposed between them and the tool carrier are threaded plugs, whereby threaded holes are provided in corresponding positions of the said hollow body adapted to receive and hold said threaded plugs in screw-thread engagement.

References Cited in the file of this patent

UNITED STATES PATENTS

| | | |
|---|---|---|
| 1,280,538 | Poliakoff | Oct. 1, 1918 |
| 1,381,288 | Davis | June 14, 1921 |
| 1,637,676 | Von Bohuszewicz et al. | Aug. 2, 1927 |
| 2,011,086 | Shaw | Aug. 13, 1935 |
| 2,465,757 | Schlesinger | Mar. 29, 1949 |
| 2,477,457 | Hughes | July 26, 1949 |

FOREIGN PATENTS

| | | |
|---|---|---|
| 595,020 | Great Britain | Nov. 25, 1947 |